(12) United States Patent
Hsiao et al.

(10) Patent No.: US 9,366,859 B2
(45) Date of Patent: Jun. 14, 2016

(54) TOUCH PROJECTION SYSTEM

(71) Applicants: QISDA OPTRONICS (SUZHOU) CO., LTD., Suzhou, Jiangsu Province (CN); QISDA CORPORATION, Taoyuan County (TW)

(72) Inventors: Chi-Hung Hsiao, Taoyuan County (TW); Ying-Fang Lin, Taoyuan County (TW)

(73) Assignees: QISDA OPTRONICS (SUZHOU) CO., LTD., New District, Suzhou, Jiangsu Province (CN); QISDA CORPORATION, Shan-Ting Tsun, Gueishan Hsiang, Taoyuan County (TW)

( * ) Notice: Subject to any disclaimer, the term of this patent is extended or adjusted under 35 U.S.C. 154(b) by 1 day.

(21) Appl. No.: 14/580,236

(22) Filed: Dec. 23, 2014

(65) Prior Publication Data

US 2015/0177511 A1   Jun. 25, 2015

(30) Foreign Application Priority Data

Dec. 24, 2013   (TW) .............................. 102147991 A

(51) Int. Cl.
*G06F 3/042* (2006.01)
*G02B 26/08* (2006.01)
*G03B 21/28* (2006.01)
*G02B 17/04* (2006.01)
*G02B 27/12* (2006.01)
*G02B 5/04* (2006.01)

(52) U.S. Cl.
CPC ............ *G02B 26/0833* (2013.01); *G02B 17/04* (2013.01); *G02B 27/126* (2013.01); *G03B 21/28* (2013.01); *G06F 3/0425* (2013.01); *G02B 5/04* (2013.01)

(58) Field of Classification Search
CPC ... G06F 3/0421; G06F 3/0425; G06F 1/1639; G06F 3/042; G02B 17/04; G02B 26/0833; G02B 27/126; G02B 5/04; G03B 21/28; G03B 21/008
USPC ........................................................ 345/175
See application file for complete search history.

(56) References Cited

U.S. PATENT DOCUMENTS

| 8,217,332 | B2  |  7/2012 | Chen |          |
|-----------|-----|---------|------|----------|
| 2006/0098309 | A1* |  5/2006 | Chen ........................ | G02B 5/04 359/833 |
| 2007/0263174 | A1* | 11/2007 | Shyu ...................... | G03B 21/26 353/34 |

(Continued)

FOREIGN PATENT DOCUMENTS

| TW | 200742869 | 11/2007 |
| TW | 201015111 |  4/2010 |

(Continued)

*Primary Examiner* — Hong Zhou
(74) *Attorney, Agent, or Firm* — Winston Hsu; Scott Margo

(57) ABSTRACT

A touch projection system includes a screen, an image-capturing device, a micromirror device, and a TIR prism disposed in front of the micromirror device. The TIR prism includes an optical path compensation structure or a hollowed channel, so that an image light from the screen, traveling through the TIR prism to be reflected by the micromirror device, can travel through the optical path compensation structure or the hollowed channel to avoid a probable optical path difference on the image light due to traveling through the TIR prism. Thereby, the invention can solve that a distortion may be induced in a touch image formed by the image-capturing device receiving the image light reflected by the micromirror device.

17 Claims, 7 Drawing Sheets

(56) References Cited

U.S. PATENT DOCUMENTS

| | | | |
|---|---|---|---|
| 2008/0074624 A1* | 3/2008 | Liu | G02B 5/04 353/81 |
| 2011/0310060 A1 | 12/2011 | Li | |
| 2012/0280941 A1* | 11/2012 | Hu | G03B 33/12 345/175 |
| 2012/0306815 A1* | 12/2012 | Su | G06F 3/042 345/175 |

FOREIGN PATENT DOCUMENTS

| | | |
|---|---|---|
| TW | 201037451 | 10/2010 |
| TW | 201037452 | 10/2010 |

* cited by examiner

TOUCH PROJECTION SYSTEM

BACKGROUND OF THE INVENTION

1. Field of the Invention

The invention relates to a projection system, and especially relates to a touch projection system.

2. Description of the Prior Art

Recently, touch applications develop rapidly. Some kinds of projectors are designed to cooperate with touch technology. Common touch technology at present is to form an infrared light curtain in front of a screen. A receiving module is added into a projector for receiving image light produced by the infrared light curtain, so that a touch operation of a user can be determined by analyzing an image of the user interrupting the infrared light curtain. In practice, the receiving module can be integrated with a projection lens of the projector. The image light enters the projector through the projection lens and is reflected by a micromirror device (e.g. a digital micromirror device, DMD) to an image-capturing device. Furthermore, in some kinds of projectors, a total internal reflection (TIR) prism is disposed in front of the DMD. Projection light produced by a light source device is reflected by the TIR prism to the micromirror device, is reflected by the micromirror device to be projected onto the screen to form a projection image. In this configuration, the image light from the screen passes through the TIR prism, is then reflected by the DMD, passes through the TIR prism again, and is received by the image-capturing device. After the image light is reflected by the DMD, an optical distance for the image light to travel in the TIR prism varies as traveling direction, which leads to a distortion of a touch image formed by the image light received by the image-capturing device so that the corresponding touch operation may be determined incorrectly or fail.

SUMMARY OF THE INVENTION

An objective of the invention is to provide a touch projection system. Its TIR prism has an optical path compensation structure or a hollowed channel, by which an optical path difference of image light probably induced in passing through the TIR prism can be avoided, so that distortion can be eliminated from the touch image formed by the image light.

A touch projection system according to invention includes a screen, a light source device, an image-capturing device, a micromirror device, and a TIR prism. The light source device is used for emitting projection light. The image-capturing device is used for receiving image light from the screen. The micromirror device is used for reflecting the projection light and the image light. The TIR prism includes a main body and an optical path compensation structure. The main body has a first side surface, a second side surface, a third side surface, and a fourth side surface. The second side surface is opposite to the first side surface. The third side surface and the fourth side surface are adjacent to the second side surface. The second side surface faces the micromirror device. The projection light from the light source device enters the main body through the third side surface, exits out the main body through the second side surface, is reflected by the micromirror device to enter the main body through the second side surface, and exits out the main body through the first side surface to be projected onto the screen. The optical path compensation structure is fixedly disposed on the fourth side surface. The image light from the screen enters the main body through the first side surface, exits out the main body through the second side surface, is reflected by the micromirror device to enter the main body through the second side surface, and exits out the main body through the optical path compensation structure to be received by the image-capturing device. Therein, optical distances for the image light to travel from entering the main body through different portions of the second side surface to exiting out the main body through the optical path compensation structure are substantially equivalent. Thereby, a touch image formed by the image light received by the image-capturing device has no distortion substantially, so that a touch operation on the screen by a user can be determined correctly based on the touch image.

Another touch projection system according to invention includes a screen, a light source device, an image-capturing device, a micromirror device, and a TIR total internal reflection prism. The light source device is used for emitting projection light. The image-capturing device is used for receiving image light from the screen. The micromirror device is used for reflecting the projection light and the image light. The total internal reflection prism includes a main body. The main body has a first side surface, a second side surface, a third side surface, and a fourth side surface. The second side surface is opposite to the first side surface. The third side surface and the fourth side surface are adjacent to the second side surface. The second side surface faces the micromirror device. The main body has a hollowed channel passing through the second side surface and the fourth side surface. Therein, the projection light from the light source device enters the main body through the third side surface, exits out the main body through the second side surface, is reflected by the micromirror device to enter the main body through the second side surface, and exits out the main body through the first side surface to be projected onto the screen. The image light from the screen enters the main body through the first side surface, exits out the main body, is reflected by the micromirror device to pass through the main body from the second side surface to the fourth side surface by the hollowed channel, and is received by the image-capturing device. Similarly, a touch image formed by the image light received by the image-capturing device has no distortion substantially, so that a touch operation on the screen by a user can be determined correctly based on the touch image.

Compared with the prior art, the TIR prism of the touch projection system of the invention has the optical path compensation structure or the hollowed channel, by which an optical path difference of image light probably induced in passing through the TIR prism can be avoided or reduced greatly, so that the touch image formed by the image light received by the image-capturing device has no distortion substantially, and an touch operation on the screen by a user can be determined correctly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
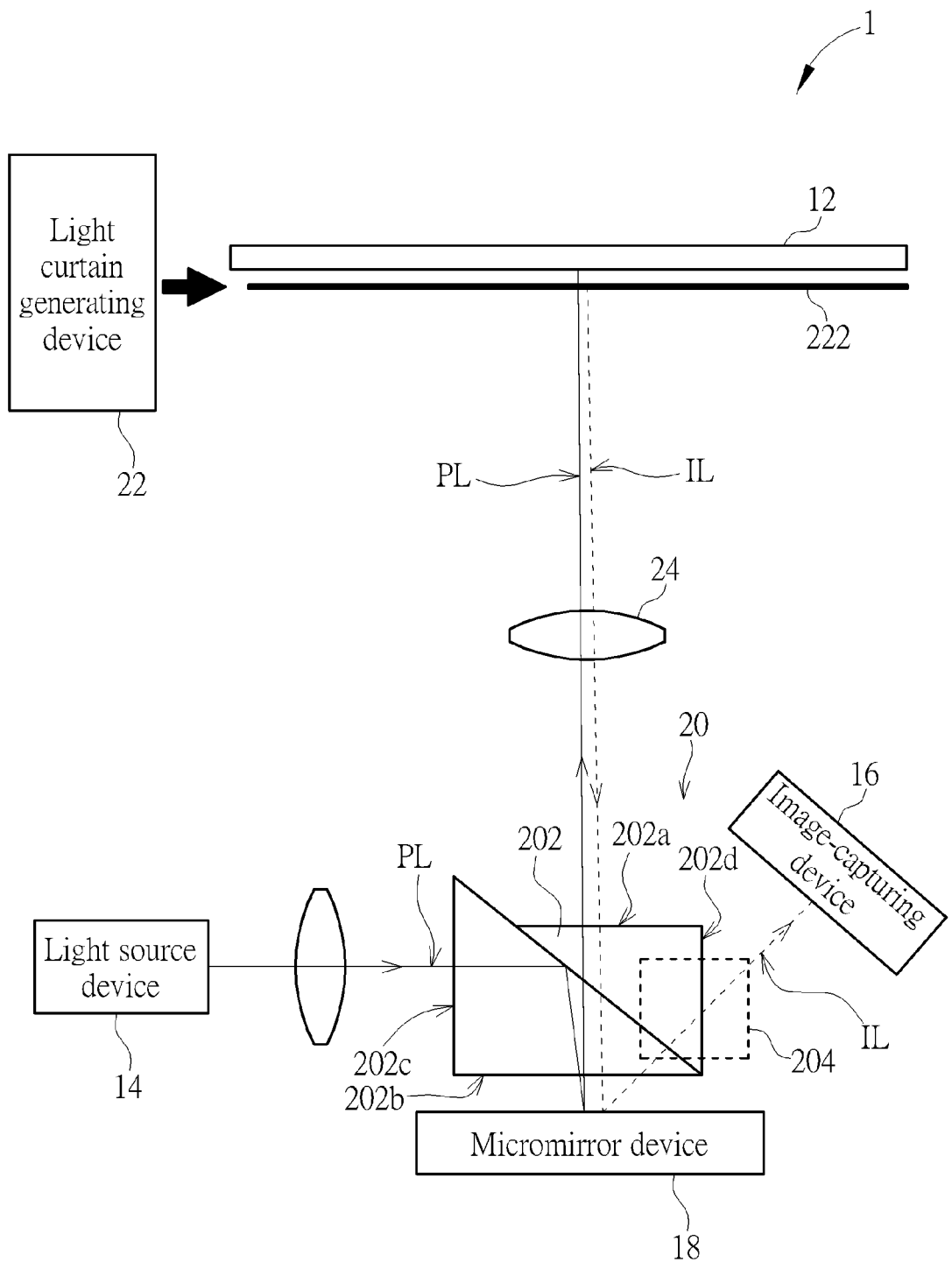
FIG. 1 is a schematic diagram illustrating a touch projection system of a preferred embodiment according to the invention.

Please refer to FIG. 1, which is a schematic diagram illustrating a touch projection system 1 of a preferred embodiment according to the invention. The touch projection system 1 includes a screen 12, a light source device 14, an image-capturing device 16, a micromirror device 18, a TIR prism 20, a light curtain generating device 22, and a lens 24. The light source device 14 is used for emitting projection light PL. The image-capturing device 16 is used for receiving image light IL from the screen 12. The micromirror device 18 can be but not limited to a DMD for example. The micromirror device 18 is used for reflecting the projection light PL to pass through the lens 24 to be projected onto the screen 12 to form a projection image, and is also used for reflecting the image light IL to be received by the image-capturing device 16. The TIR prism 20 is disposed in front of the micromirror device 18 and is capable of reflecting the projection light PL produced by the light source device 14 to the micromirror device 18 and allowing the projection light PL reflected by the micromirror device 18 to pass through. The light curtain generating device 22 produces a light curtain 222 in front of the screen 12. The image light IL is produced by the light curtain 222. In practice, the image light IL actually comes from the light curtain 222 in front of the screen 12; however, under the scale of the whole touch projection system 1, the light curtain 222 is very close to the screen 12. Therefore, for simple illustration, in this specification, the image light IL is taken as coming from the screen 12.

Figure 2:
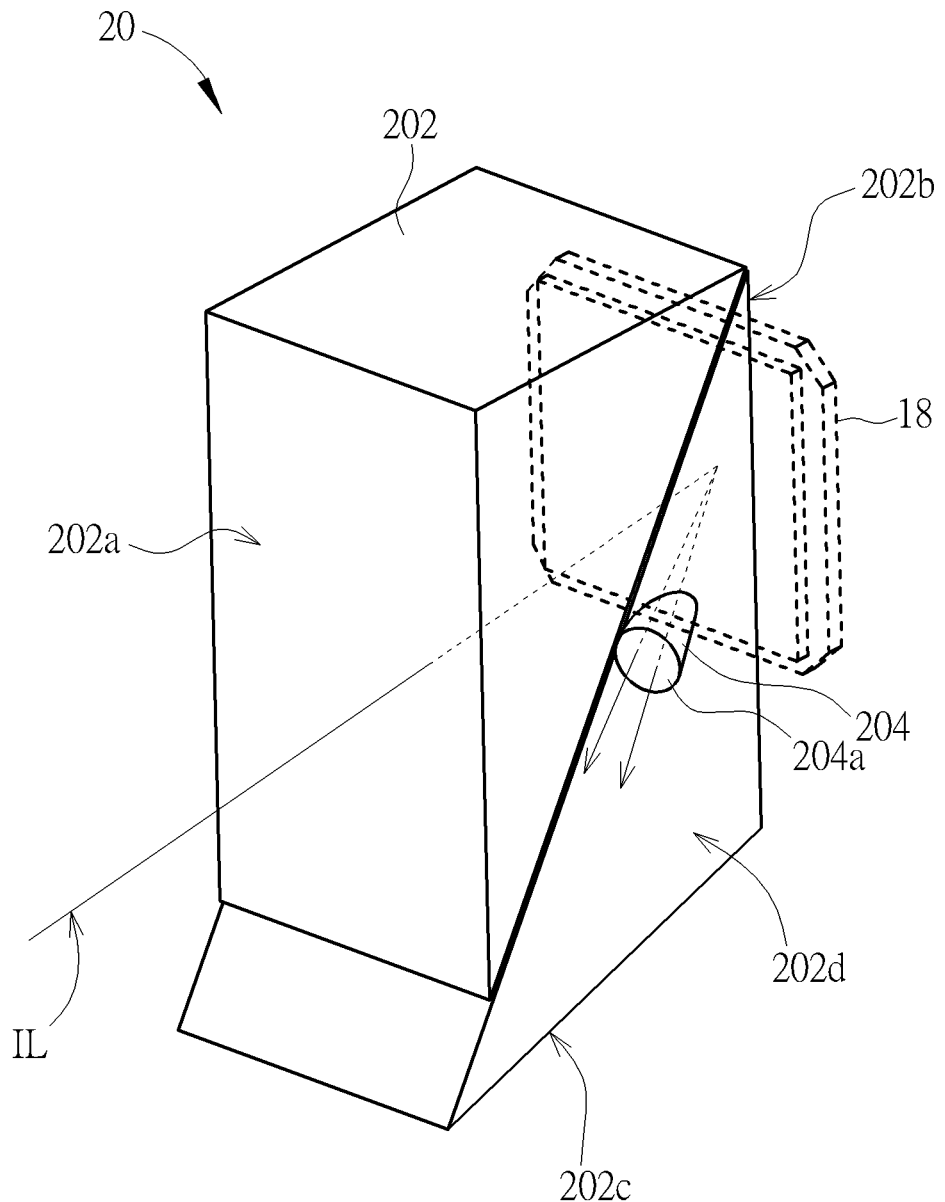
FIG. 2 is a schematic diagram illustrating a TIR prism of the touch projection system in FIG. 1.

Please also refer to FIG. 2. FIG. 2 is a schematic diagram illustrating the TIR prism 20. The TIR prism 20 includes a main body 202 and an optical path compensation structure 204 (represented by a dashed rectangle in FIG. 1). The main body 202 has a first side surface 202a, a second side surface 202b opposite to the first side surface 202a, a third side surface 202c, and a fourth side surface 202d. The second side surface 202b and the first side surface 202a are parallel. The third side surface 202c and the fourth side surface 202d are adjacent to the second side surface 202b. The second side surface 202b faces the micromirror device 18. It is added that in FIG. 1, the TIR prism 20 and the traveling paths of the projection light PL and the image light IL are shown in concept. In the embodiment, description about the structure of the TIR prism 20 is mainly based on the structure shown in FIG. 2. Therein, in FIG. 2, the micromirror device 18 is shown with its profile in dashed lines, for the relative disposition of the TIR prism 20 and the micromirror device 18. The projection light PL from the light source device 14 enters the main body 202 through the third side surface 202c, exits the main body 202 through the second side surface 202b, is reflected by the micromirror device 18, enters the main body 202 again through the second side surface 202b, and exits the main body 202 through the first side surface 202a to be projected onto the screen 12. The optical path compensation structure 204 is fixedly disposed on the fourth side surface 202d. The image light IL from the screen 12 passes through the lens 24 to enter the main body 202 through the first side surface 202a, exits the main body 202 through the second side surface 202b, is reflected by the micromirror device 18, enters the main body 202 again through the second side surface 202b, and exits the main body 202 through the optical path compensation structure 204 to be received by the image-capturing device 16. Therein, the image light IL is represented by solid lines with arrows in FIG. 2; the portion hidden by the main body 202 is shown by dashed lines. Optical distances, which the image light IL travels from entering the main body 202 through different portions of the second side surface 202b to exiting out the main body 202 through the optical path compensation structure 204, are substantially equivalent. Therein, the substantial equivalence is not limited to be exactly the same. In principle, the difference among the optical distances for the image light IL passing through the optical path compensation structure 204 can be controlled within a certain tolerance, so that the distortion degree of a touch image formed by the image light IL will not influence the accuracy in determining a touch operation. The certain tolerance for the difference among the optical distances can be obtained by people skilled in the art according to the specifications (e.g. touch sensitivity, sensing frequency, etc.) of a product and will not be described in addition. In the embodiment, the optical path compensation structure 204 is a protrusive structure. The protrusive structure protrudes from the main body 202 and is formed on the fourth side surface 202d. An optical distance for the image light relatively close to the main body to travel through the main body is longer than an optical distance for the image light relatively away from the main body to travel through the main body, and an optical distance for the image light relatively close to the main body to travel through the optical path compensation structure is shorter than an optical distance for the image light relatively away from the main body to travel through the optical path compensation structure. The optical path compensation structure 204 substantially shows a cylinder structure or a conical structure. An end surface of the cylinder structure or a bottom surface 204a of the conical structure faces the image-capturing device 16. Therein, the end surface or the bottom surface 204a is non-parallel to the second side surface 202b, but the invention is not limited thereto. The image light IL exits out the optical path compensation structure 204 through the end surface or the bottom surface 204a. Thereby, the touch image formed by the image light received by the image-capturing device 16 has no distortion substantially, so that a touch operation on the screen 12 by a user can be determined correctly based on the touch image.

Figure 3:
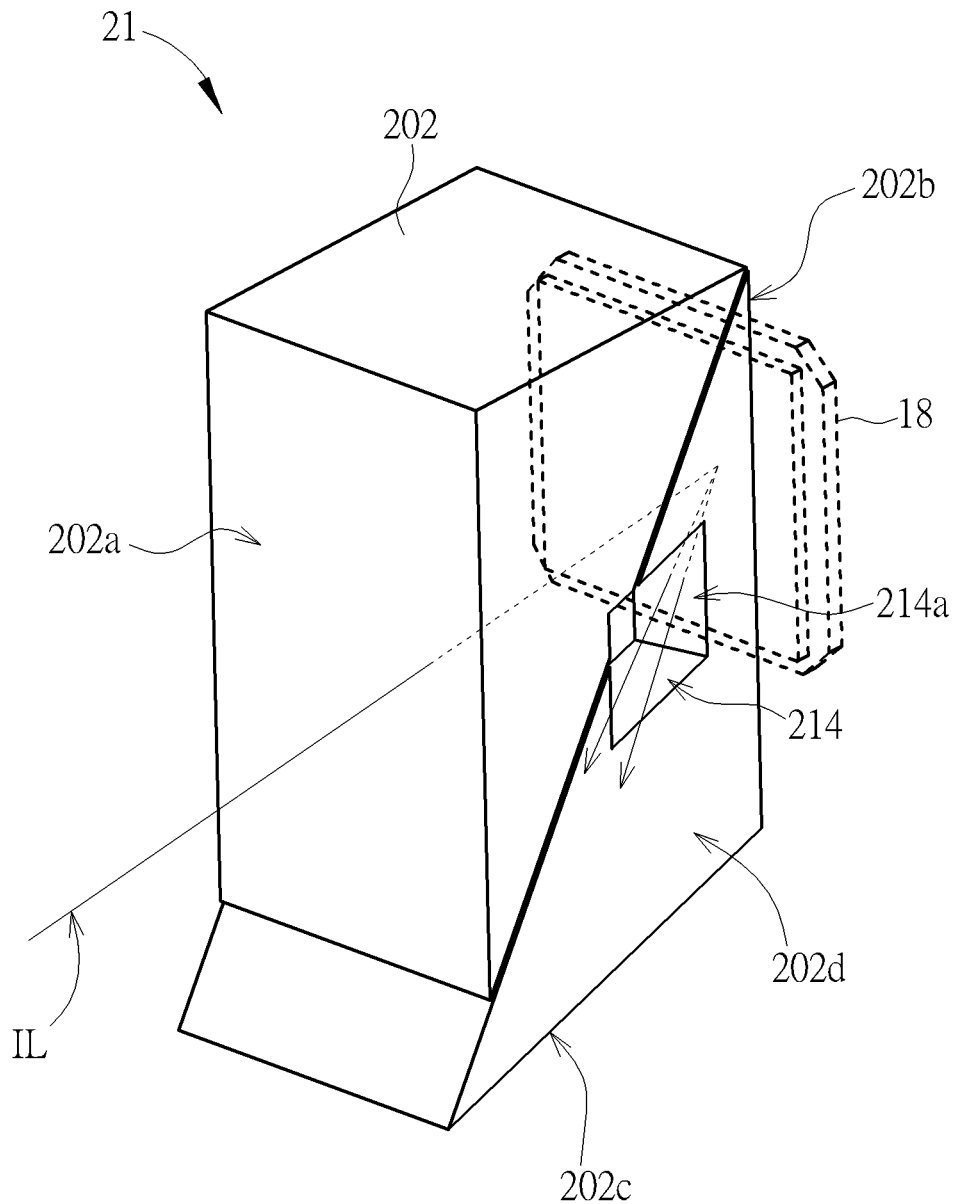
FIG. 3 is a schematic diagram illustrating a TIR prism according to another embodiment.

In the embodiment, the optical path compensation structure 204 is realized by the protrusive structure, but the invention is not limited thereto. Please refer to FIG. 1 and FIG. 3. FIG. 3 is a schematic diagram illustrating a TIR prism 21 according to another embodiment. The disposition of the TIR prism 21 in the touch projection system 1 is the same as the TIR prism 20, so the disposition relations of the TIR prism 21 to the other components can refer to the TIR prism 20 in FIG. 1 and will not be described in addition. In the embodiment, the TIR prism 21 is structurally similar to the TIR prism 20 and uses the same notation as the TIR prism 20. A main difference between the TIR prism 21 and the TIR prism 20 is that the optical path compensation structure 214 of the TIR prism 21 is a recess structure. The recess structure is formed on the fourth side surface 202d and has an inner side surface 214a. Therein, in the embodiment, the recess structure includes the side wall portions (e.g. including the portion from the inner side surface 214a to the second side surface 202b) forming the recess space. The image light IL exits out the optical path compensation structure 214 through the inner side surface 214a. Similarly, the touch image formed by the image light received by the image-capturing device 16 has no distortion substantially, so that a touch operation on the screen 12 by a user can be determined correctly based on the touch image. It is added that in the embodiment, the recess structure substantially shows a rectangle recess structure, but the invention is not limited thereto. For example, according to the distribution of paths of the image light IL traveling in the optical path compensation structure 214, the recess structure also can be realized by a wedge recess structure. Furthermore, other descriptions of the TIR prism 21 refer to the relational descriptions of the TIR prism 20 and will not be described in addition.

It is added more that in the TIR prisms 20 and 21 of the above embodiments, the third side surface 202c is adjacent to the fourth side surface 202d, but the invention is not limited thereto. In practice, the relationship between the third side surface 202c and the fourth side surface 202d relative to the main body 202 depends on the operation of the micromirror device 18. For example, the disposition of the third side surface 202c and the fourth side surface 202d is designed according to the reflection directions offered by the micromirror device 18; it will not be described in detail herein.

Figure 4:
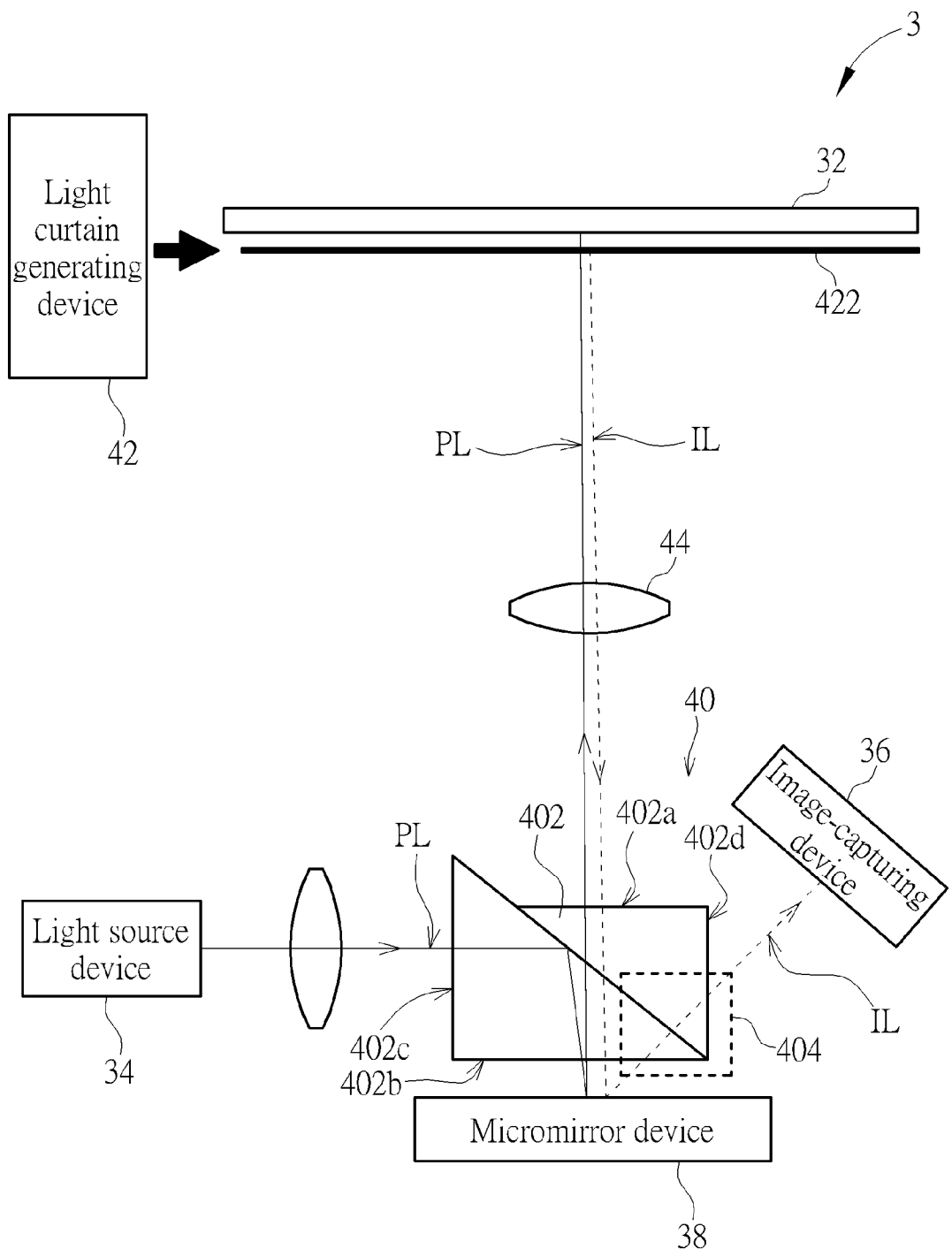
FIG. 4 is a schematic diagram illustrating a touch projection system of another preferred embodiment according to the invention.

In the above embodiments, the optical path difference in the prior art is solved by changing or compensating the optical distance for the image light IL traveling in the TIR prisms 20 and 21 again after reflected by the micromirror device 18. However, the invention is not limited thereto. Please refer to FIG. 4, which is a schematic diagram illustrating a touch projection system 3 of another preferred embodiment according to the invention. The touch projection system 3 includes a screen 32, a light source device 34, an image-capturing device 36, a micromirror device 38, a TIR prism 40, a light curtain generating device 42, and a lens 44. The light source device 34 is used for emitting projection light PL. The image-capturing device 36 is used for receiving image light IL from the screen 32. The micromirror device 38 can be but not limited to a DMD for example. The micromirror device 38 is used for reflecting the projection light PL pass through the lens 44 to be projected onto the screen 32 to form a projection image, and is also used for reflecting the image light IL to be received by the image-capturing device 36. The TIR prism 40 is disposed in front of the micromirror device 38 and is capable of reflecting the projection light PL produced by the light source device 34 to the micromirror device 38 and allowing the projection light PL reflected by the micromirror device 38 to pass through. The light curtain generating device 42 produces a light curtain 422 in front of the screen 32. The image light IL is produced by the light curtain 422. In practice, the image light IL actually comes from the light curtain 422 in front of the screen 32; however, under the scale of the whole touch projection system 3, the light curtain 422 is very close to the screen 32. Therefore, for simple illustration, in this specification, the image light IL is taken as coming from the screen 32.

Figure 5:
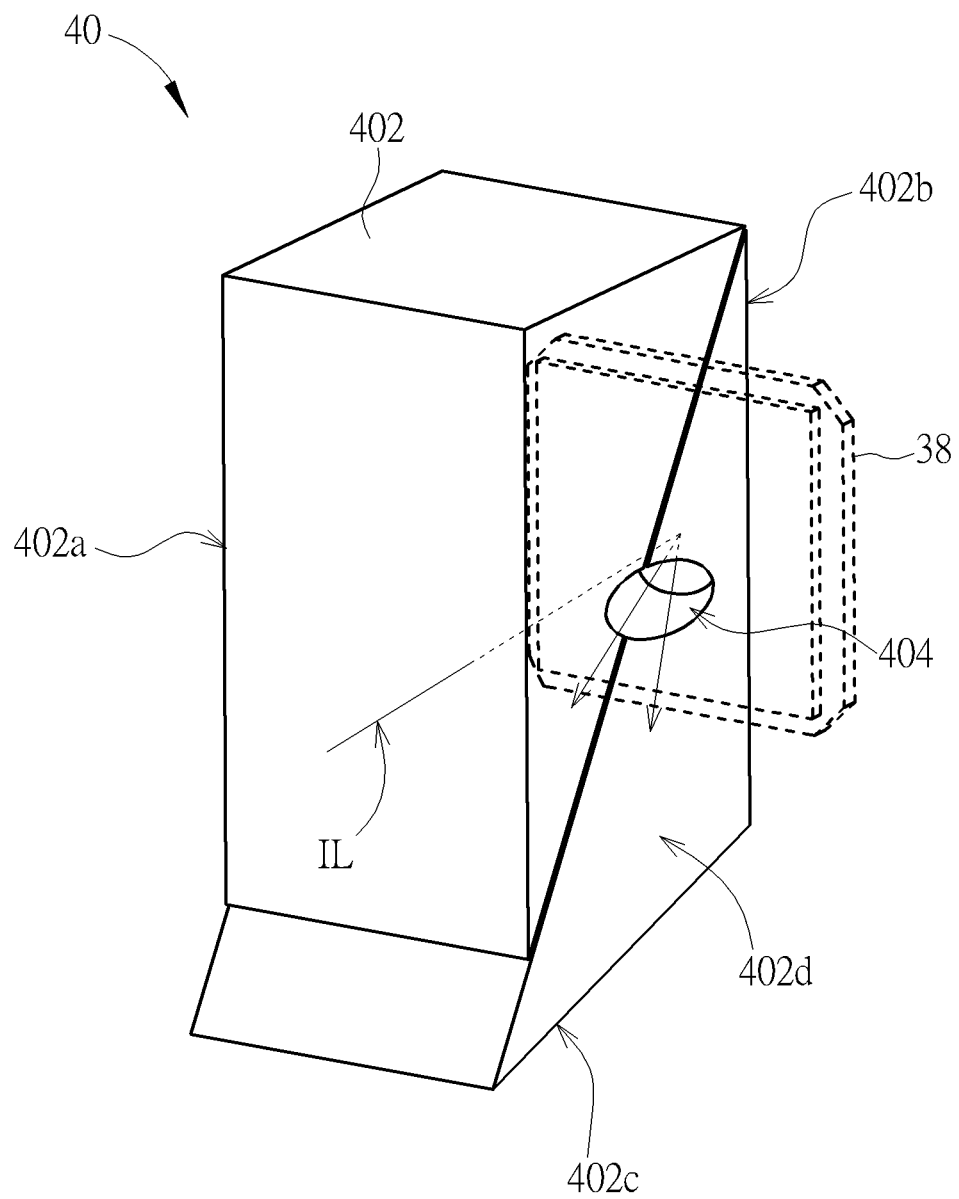
FIG. 5 is a schematic diagram illustrating a TIR prism of the touch projection system in FIG. 4.

Please also refer to FIG. 5. FIG. 5 is a schematic diagram illustrating the TIR prism 40. The TIR prism 40 includes a main body 402. The main body 402 has a first side surface 402a, a second side surface 402b, a third side surface 402c, and a fourth side surface 402d. The second side surface 402b is opposite to the first side surface 402a. The third side surface 402c and the fourth side surface 402d are adjacent to the second side surface 402b. The second side surface 402b faces the micromirror device 38. The main body 402 also has a hollowed channel 404 (represented by a dashed rectangle in FIG. 4) passing through the second side surface 402b and the fourth side surface 402d. It is added that in FIG. 4, the TIR prism 40 and the traveling paths of the projection light PL and the image light IL are shown in concept. In the embodiment, description about the structure of the TIR prism 40 is mainly based on the structure shown in FIG. 5. Therein, in FIG. 5, the micromirror device 38 is shown with its profile in dashed lines, for the relative disposition of the TIR prism 40 and the micromirror device 38. The projection light PL from the light source device 34 passes through the lens 44 to enter the main body 402 through the third side surface 402c, exits the main body 402 through the second side surface 402b, is reflected by the micromirror device 38, enters the main body 402 again through the second side surface 402b, and exits the main body 402 through the first side surface 402a to be projected onto the screen 32. The image light IL from the screen 32 enters the main body 402 through the first side surface 402a, exits the main body 402 through the second side surface 402b, is reflected by the micromirror device 38 to pass through the main body 402 from the second side surface 402b to the fourth side surface 402d by the hollowed channel 404, and is received by the image-capturing device 36. Therein, the image light IL is represented by solid lines with arrows in FIG. 5; the portion hidden by the main body 402 is shown by dashed lines. After reflected by the micromirror device 38, the image light IL will not physically pass through the solid portion of the main body 402, so the optical path difference in the prior art will not occur here. That is, the touch image formed by the image light IL received by the image-capturing device 36 has no distortion substantially, so that a touch operation on the screen 32 by a user can be determined correctly based on the touch image.

It is added that in practice, any influence by the hollowed channel 404 on the normal projection of the projection light PL needs to be considered into the location of the hollowed channel 404 at the main body 402, so that the projection light PL can be travel in the TIR prism 40 without interference with the hollowed channel 404. The above consideration can be satisfied easily through simple designs, tests by people skilled in the art according to the description, which will not be described in addition. Furthermore, after reflected by the micromirror device 38, the image light IL does not pass through the main body 402 physically, but the image light IL does pass through the space occupied by the main body 402 as a whole (i.e. the space enclosed by the outer profile of the main body 402, or the space required for disposing the main body 402). Therefore, in a broad concept, the hollowed channel 404 and the optical path compensation structure 204 are similar in technological logic; they both adopt a technology of using a structure to overcome a probable optical path difference of the image light IL when passing through the main bodies 202 and 402.

Figure 6:
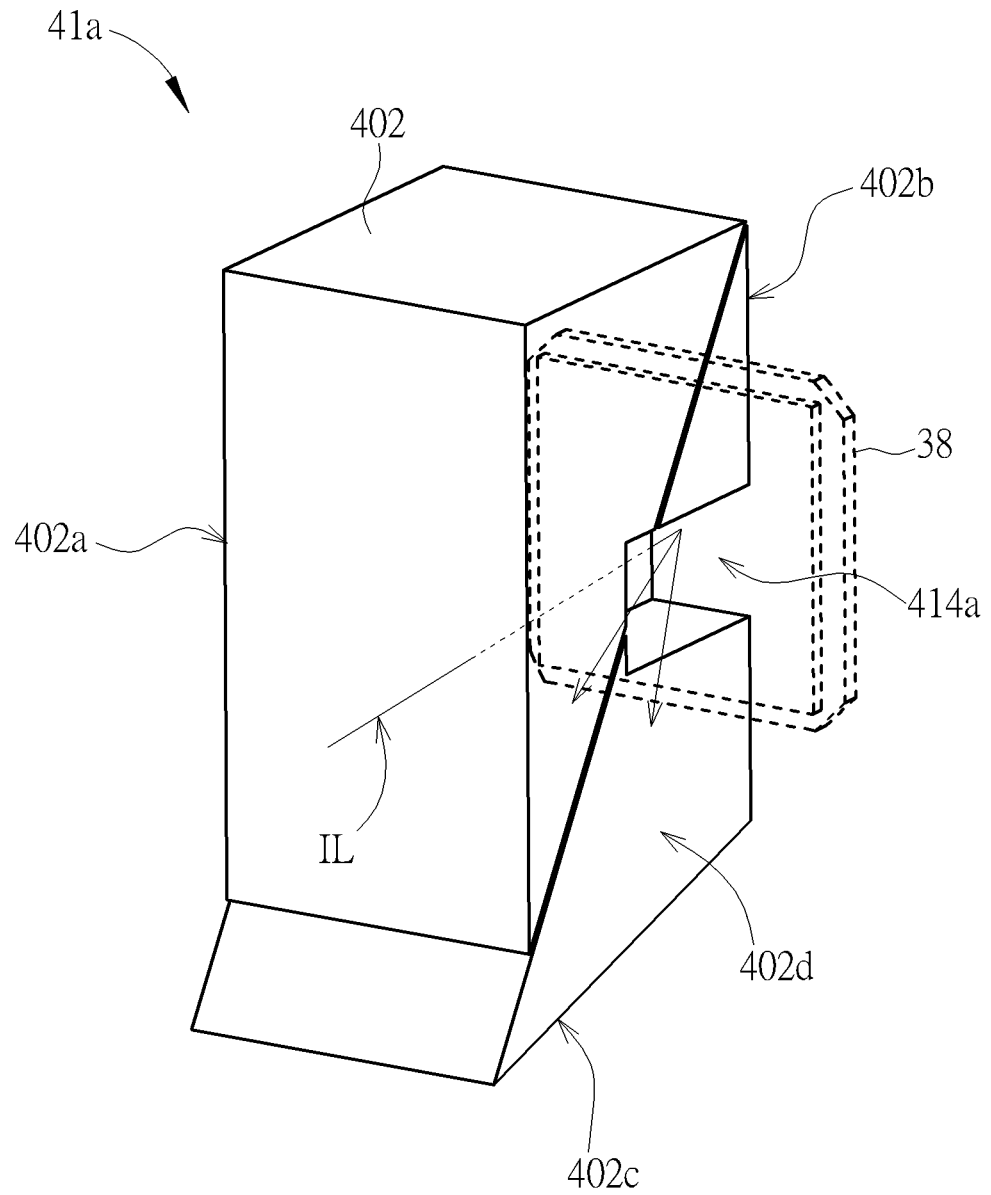
FIG. 6 is a schematic diagram illustrating a TIR prism according to another embodiment.

In addition, in the embodiment, the hollowed channel 404 is realized by a conical channel connecting the second side surface 402b and the fourth side surface 402d (with a relative small opening at the second side surface 402b and a relative larger opening at the fourth side surface 402d), but the invention is not limited thereto. Please refer to FIG. 4 and FIG. 6. FIG. 6 is a schematic diagram illustrating a TIR prism 41a according to another embodiment. The disposition of the TIR prism 41a in the touch projection system 3 is the same as the TIR prism 40, so the disposition relations of the TIR prism 41a to the other components can refer to the TIR prism 40 in FIG. 4 and will not be described in addition. In the embodiment, the TIR prism 41a is structurally similar to the TIR prism 40 and uses the same notation as the TIR prism 40. A main difference between the TIR prism 41a and the TIR prism 40 is that the hollowed channel 414a of the TIR prism 41a is a recess structure (or an open slot) formed where the second side surface 402b adjoins the fourth side surface 402d. The recess structure dents inward from the second side surface 402b and the fourth side surface 402d. The hollowed channel 414a is similar to the hollowed channel 404, but the hollowed channel 414a is formed more conveniently than the hollowed channel 404. Similarly, after reflected by the micromirror device 38, the image light IL passes through the main body 402 by the hollowed channel 414a to be received by the image-capturing device 36. The touch image formed by the image light IL received by the image-capturing device 36 has no distortion substantially, so that a touch operation on the screen 32 by a user can be determined correctly based on the touch image. It is added that in practice, according to the distribution of paths of the image light IL traveling in the hollowed channel 414a, the recess structure (i.e. hollowed channel 414a) also can be realized by a wedge recess structure, not limited to the rectangle recess as shown in the embodiment.

Figure 7:
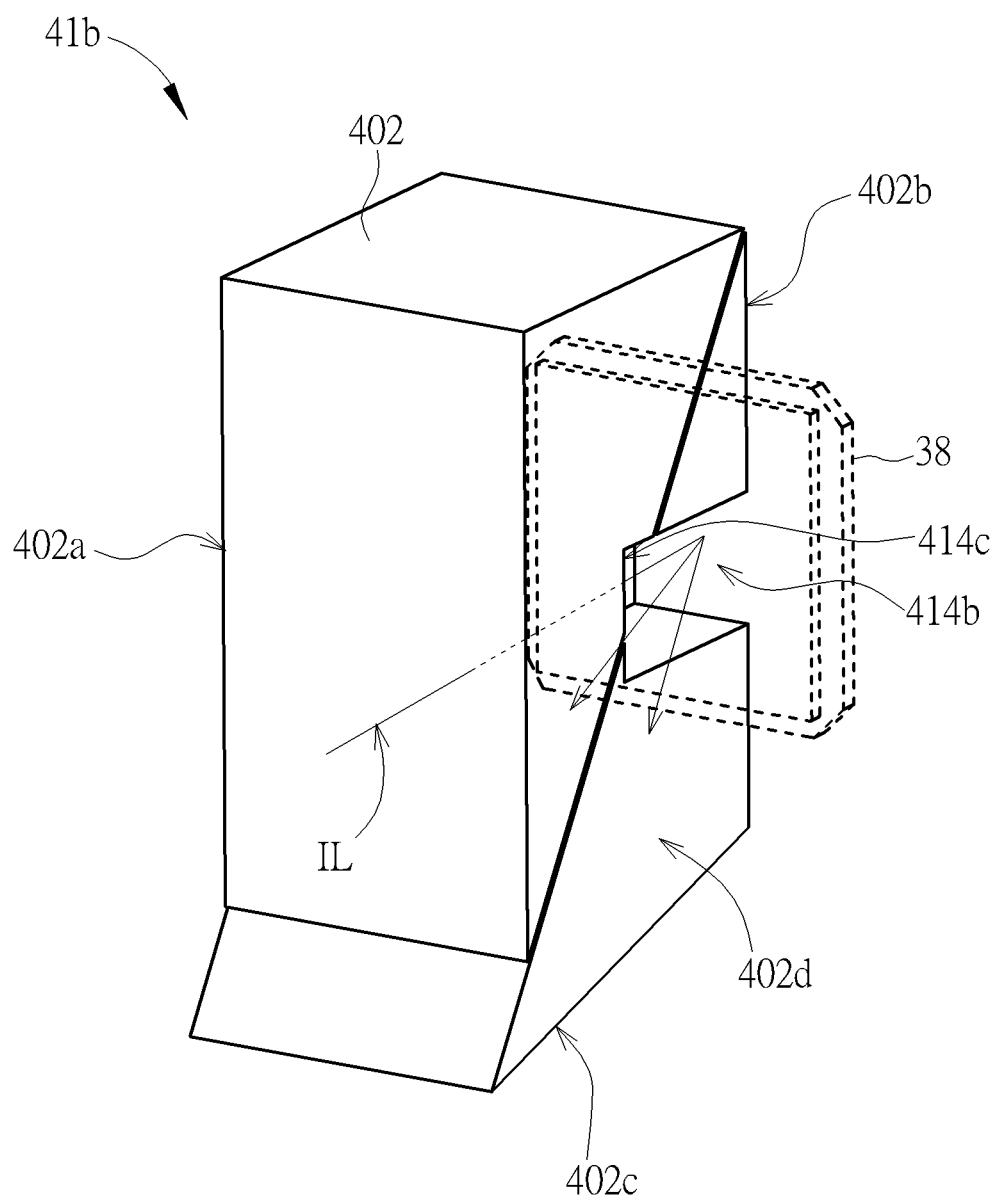
FIG. 7 is a schematic diagram illustrating a TIR prism according to another embodiment.

In addition, in the embodiment, after entering the main body 402 through the first side surface 402a, the image light IL exits out the main body 402 through the second side surface 402b, is reflected by the micromirror device 38, and passes through the main body 402 by the hollowed channel 414a. But the invention is not limited thereto. Please refer FIG. 4 and FIG. 7. FIG. 7 is a schematic diagram illustrating a TIR prism 41b according to another embodiment. The disposition of the TIR prism 41b in the touch projection system 3 is the same as the TIR prism 40, so the disposition relations of the TIR prism 41b to the other components can refer to the TIR prism 40 in FIG. 4 and will not be described in addition. In the embodiment, the TIR prism 41b is structurally similar to the TIR prism 40a and uses the same notation as the TIR prism 40a. A main difference between the TIR prism 41a and the TIR prism 40a is that the recess structure (i.e. the hollowed channel 414b) of the TIR prism 41b is deeper in depth. The recess structure has an inner side surface 414c opposite to the first side surface 402a. The inner side surface 414c faces the image-capturing device 36, so that the image light IL from the screen 32 enters the main body 402 through the first side surface 402a, enters the recess structure (i.e. the hollowed channel 414b) through the inner side surface 414c to exit out the main body 402, is reflected by the micromirror device 38 to pass through the main body 402 from the second side surface 402b to the fourth side surface 402d by the recess structure, and is received by the image-capturing device 36. Similarly, the touch image formed by the image light IL received by the image-capturing device 36 has no distortion substantially, so that a touch operation on the screen 32 by a user can be determined correctly based on the touch image. It is added that in practice, the side surface 414c and the first side surface 402a are parallel. Furthermore, in the TIR prisms 40, 41a and 41b of the above embodiments, the third side surface 402c is adjacent to the fourth side surface 402d, but the invention is not limited thereto. In practice, the relationship between the third side surface 402c and the fourth side surface 402d relative to the main body 402 depends on the operation of the micromirror device 38. For example, the disposition of the third side surface 402c and the fourth side surface 402d is designed according to the reflection directions offered by the micromirror device 38; it will not be described in detail herein.

As discussed above, the TIR prism of the touch projection system of the invention has the optical path compensation structure or the hollowed channel, by which an optical path difference of image light probably induced in passing through the TIR prism can be avoided or reduced greatly, so that the touch image formed by the image light received by the image-capturing device has no distortion substantially, and an touch operation on the screen by a user can be determined correctly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch projection system, comprising:
   a screen;
   a light source device for emitting projection light;
   an image-capturing device for receiving image light from the screen;
   a micromirror device for reflecting the projection light and the image light; and
   a total internal reflection prism, comprising:
      a main body having a first side surface, a second side surface, a third side surface, and a fourth side surface, the second side surface being opposite to the first side surface, the third side surface and the fourth side surface being adjacent to the second side surface, the second side surface facing the micromirror device, the projection light from the light source device entering the main body through the third side surface, exiting out the main body through the second side surface, being reflected by the micromirror device to enter the main body through the second side surface, and exiting out the main body through the first side surface to be projected onto the screen; and
      an optical path compensation structure fixedly disposed on the fourth side surface, the image light from the screen entering the main body through the first side surface, exiting out the main body through the second side surface, being reflected by the micromirror device to enter the main body through the second side surface, and exiting out the main body through the optical path compensation structure to be received by the image-capturing device, wherein optical distances for the image light to travel from entering the main body through different portions of the second side surface to exiting out the main body through the optical path compensation structure are substantially equivalent.

2. The touch projection system of claim 1, wherein the optical path compensation structure is a protrusive structure, and the protrusive structure protrudes from the main body and is formed on the fourth side surface.

3. The touch projection system of claim 2, wherein the optical path compensation structure substantially shows a cylinder structure or a conical structure, an end surface of the cylinder structure or a bottom surface of the conical structure faces the image-capturing device, and the image light exits out the optical path compensation structure through the end surface or the bottom surface.

4. The touch projection system of claim 1, wherein the optical path compensation structure is a recess structure, the recess structure is formed on the fourth side surface and has an inner side surface facing the image-capturing device, and the image light exits out the optical path compensation structure through the inner side surface.

5. The touch projection system of claim 1, wherein the third side surface is adjacent to the fourth side surface.

6. The touch projection system of claim 1, wherein an optical distance for the image light relatively close to the main body to travel through the main body is longer than an optical distance for the image light relatively away from the main body to travel through the main body, and an optical distance for the image light relatively close to the main body to travel through the optical path compensation structure is shorter than an optical distance for the image light relatively away from the main body to travel through the optical path compensation structure.

7. The touch projection system of claim 1, wherein the image-capturing device faces the fourth side surface.

8. The touch projection system of claim 1, further comprising a light curtain generating device for producing a light curtain in front of the screen, wherein the image light is produced by the light curtain.

9. The touch projection system of claim 1, further comprising a lens, wherein the projection light passes through the lens to be projected onto the screen, and the image light from the screen passes through the lens to enter the main body through the first side surface.

10. A touch projection system, comprising:
a screen;
a light source device for emitting projection light;
an image-capturing device for receiving image light from the screen;
a micromirror device for reflecting the projection light and the image light; and
a total internal reflection prism, comprising:
a main body having a first side surface, a second side surface, a third side surface, and a fourth side surface, the second side surface being opposite to the first side surface, the third side surface and the fourth side surface being adjacent to the second side surface, the second side surface facing the micromirror device, the main body having a hollowed channel passing through the second side surface and the fourth side surface;
wherein the projection light from the light source device enters the main body through the third side surface, exits out the main body through the second side surface, is reflected by the micromirror device to enter the main body through the second side surface, and exits out the main body through the first side surface to be projected onto the screen; and wherein the image light from the screen enters the main body through the first side surface, exits out the main body, is reflected by the micromirror device to pass through the main body from the second side surface to the fourth side surface by the hollowed channel, and is received by the image-capturing device.

11. The touch projection system of claim 10, wherein the hollowed channel is a recess structure formed where the second side surface adjoins the fourth side surface.

12. The touch projection system of claim 11, wherein the recess structure has an inner side surface, and the inner side surface is opposite to the first side surface and faces the image-capturing device so that the image light from the screen enters the main body through the first side surface, enters the recess structure through the inner side surface to exit out the main body, is reflected by the micromirror device to pass through the main body from the second side surface to the fourth side surface by the recess structure, and is received by the image-capturing device.

13. The touch projection system of claim 10, wherein the image light from the screen enters the main body through the first side surface, exits out the main body through the second side surface, is reflected by the micromirror device to pass through the main body from the second side surface to the fourth side surface by the hollowed channel, and is received by the image-capturing device.

14. The touch projection system of claim 10, wherein the third side surface is adjacent to the fourth side surface.

15. The touch projection system of claim 10, wherein the image-capturing device faces the fourth side surface.

16. The touch projection system of claim 10, further comprising a light curtain generating device for producing a light curtain in front of the screen, wherein the image light is produced by the light curtain.

17. The touch projection system of claim 10, further comprising a lens, wherein the projection light passes through the lens to be projected onto the screen, and the image light from the screen passes through the lens to enter the main body through the first side surface.

* * * * *